(12) United States Patent
Böhmer et al.

(10) Patent No.: US 12,576,860 B2
(45) Date of Patent: Mar. 17, 2026

(54) METHOD FOR GUIDING A MOTOR VEHICLE IN AN AT LEAST PARTIALLY AUTOMATED MANNER, AND MOTOR VEHICLE

(71) Applicant: AUDI AG, Ingolstadt (DE)

(72) Inventors: Christina Böhmer, Kösching (DE); Florian Schwensfeier, Oberhausen an der Donau (DE)

(73) Assignee: AUDI AG, Ingolstadt (DE)

( * ) Notice: Subject to any disclaimer, the term of this patent is extended or adjusted under 35 U.S.C. 154(b) by 19 days.

(21) Appl. No.: 18/711,818

(22) PCT Filed: Oct. 21, 2022

(86) PCT No.: PCT/EP2022/079383
§ 371 (c)(1),
(2) Date: May 20, 2024

(87) PCT Pub. No.: WO2023/094083
PCT Pub. Date: Jun. 1, 2023

(65) Prior Publication Data
US 2025/0018957 A1      Jan. 16, 2025

(30) Foreign Application Priority Data

Nov. 26, 2021    (DE) ..................... 10 2021 131 040.7

(51) Int. Cl.
*G06V 20/59* (2022.01)
*B60W 30/182* (2020.01)
(Continued)

(52) U.S. Cl.
CPC ...... *B60W 50/0098* (2013.01); *B60W 30/182* (2013.01); *B60W 40/08* (2013.01);
(Continued)

(58) Field of Classification Search
None
See application file for complete search history.

(56) References Cited

U.S. PATENT DOCUMENTS 7,431,120 B2 * 10/2008 Pollehn ................ B60N 2/0022
                                                          180/272
8,448,739 B2 * 5/2013 Kolich ................. B60H 3/0007
                                                          180/271
(Continued)

FOREIGN PATENT DOCUMENTS

DE        102015200775 A1    7/2016
DE        102017008863 A1    5/2018
(Continued)

OTHER PUBLICATIONS

International Preliminary Report on Patentability directed to related International Application No. PCT/EP2022/079383, with English-language translation attached, mailed May 2, 2024; 16 pages.
(Continued)

*Primary Examiner* — Jonathan M Dager
(74) *Attorney, Agent, or Firm* — Sterne, Kessler, Goldstein & Fox P.L.L.C.

(57)                ABSTRACT
Method for guiding a motor vehicle in an at least partially automated manner, wherein the parameter value of at least one parameter of the at least partially automated guidance depends on occupant information relating to a vehicle occupant, wherein the item of occupant information is determined on the basis of sensor data from at least one interior sensor at least partially representing the vehicle occupant of the motor vehicle and/or from at least one temperature sensor recording a body temperature of the vehicle occupant and/or a temperature of the interior.

10 Claims, 2 Drawing Sheets

(51) Int. Cl.

| | | |
|---|---|---|
| *B60W 40/08* | (2012.01) | |
| *B60W 50/00* | (2006.01) | |
| *B60W 50/08* | (2020.01) | |
| *G06V 40/16* | (2022.01) | |

(52) U.S. Cl.
CPC ......... *B60W 50/082* (2013.01); *G06V 20/597* (2022.01); *G06V 40/174* (2022.01); *B60W 2040/0818* (2013.01); *B60W 2040/0872* (2013.01); *B60W 2420/403* (2013.01); *B60W 2420/54* (2013.01); *B60W 2540/21* (2020.02); *B60W 2540/221* (2020.02); *B60W 2540/225* (2020.02); *B60W 2540/229* (2020.02)

(56) References Cited

U.S. PATENT DOCUMENTS

| | | | | |
|---|---|---|---|---|
| 10,004,873 | B1 * | 6/2018 | Hur | A61B 5/6893 |
| 10,226,982 | B2 * | 3/2019 | Alger | G06V 20/56 |
| 10,287,021 | B2 * | 5/2019 | Fantuzzi | A61L 9/122 |
| 10,814,701 | B2 * | 10/2020 | Starke | B60H 3/0035 |
| 10,828,959 | B2 * | 11/2020 | Duan | B60H 3/00 |
| 10,867,218 | B2 * | 12/2020 | Gallagher | G06F 18/256 |
| 10,913,539 | B2 * | 2/2021 | Fantuzzi | B01F 25/00 |
| 10,922,567 | B2 * | 2/2021 | Mahmoud | G08G 1/0129 |
| 11,279,208 | B2 * | 3/2022 | Iliffe-Moon | A61L 9/012 |
| 11,282,321 | B2 | 3/2022 | Stark | |
| 11,414,012 | B2 * | 8/2022 | Ishiko | B60H 3/0085 |
| 11,436,694 | B2 * | 9/2022 | Yeung | G06F 16/2379 |
| 11,453,414 | B2 | 9/2022 | Bader | |
| 11,527,081 | B2 * | 12/2022 | Balch | G06V 20/597 |
| 11,648,817 | B2 * | 5/2023 | Günzel | B60H 1/00771 |
| | | | | 701/36 |
| 11,702,103 | B2 * | 7/2023 | Boulanger | A61B 5/18 |
| | | | | 701/24 |
| 11,731,486 | B2 * | 8/2023 | Feldman | B60H 1/00771 |
| | | | | 701/49 |
| 11,760,169 | B2 * | 9/2023 | Varughese | B60H 3/0071 |
| | | | | 454/75 |
| 11,794,554 | B2 * | 10/2023 | Scheer | B60H 1/008 |
| 11,828,210 | B2 * | 11/2023 | Varughese | F01N 11/00 |
| 11,875,609 | B2 * | 1/2024 | Woo | H04W 4/40 |
| 12,017,506 | B2 * | 6/2024 | Varughese | B60H 3/0085 |
| 12,083,253 | B2 * | 9/2024 | Duvert | A42B 3/286 |
| 2007/0041865 | A1 * | 2/2007 | Ayoub | A61L 9/125 |
| | | | | 700/285 |
| 2010/0010956 | A1 * | 1/2010 | Bell | G01N 33/0034 |
| | | | | 702/22 |
| 2011/0046846 | A1 * | 2/2011 | Prokhorov | B60H 1/008 |
| | | | | 706/12 |
| 2015/0019024 | A1 * | 1/2015 | Sabripour | G05D 23/1927 |
| | | | | 700/276 |
| 2015/0032266 | A1 * | 1/2015 | Weast | B60H 1/00842 |
| | | | | 700/276 |
| 2015/0098860 | A1 * | 4/2015 | Aldereguia | G01N 33/0044 |
| | | | | 422/3 |

| | | | | |
|---|---|---|---|---|
| 2016/0046294 | A1 * | 2/2016 | Lee | G08B 21/06 |
| | | | | 340/576 |
| 2016/0152117 | A1 * | 6/2016 | Backman | A61L 9/03 |
| | | | | 422/125 |
| 2016/0185354 | A1 * | 6/2016 | Lisseman | G06V 20/59 |
| | | | | 382/104 |
| 2016/0188987 | A1 * | 6/2016 | Lisseman | H04N 7/18 |
| | | | | 348/148 |
| 2016/0191859 | A1 * | 6/2016 | Lisseman | B60K 35/60 |
| | | | | 348/148 |
| 2016/0320081 | A1 * | 11/2016 | Nikovski | G06F 16/2228 |
| 2017/0028987 | A1 * | 2/2017 | Yamada | B60N 2/0022 |
| 2017/0282912 | A1 * | 10/2017 | Chan | A61B 5/02055 |
| 2017/0334451 | A1 * | 11/2017 | Asakura | B60W 10/04 |
| 2017/0345429 | A1 * | 11/2017 | Hardee | G10L 25/93 |
| 2018/0335776 | A1 * | 11/2018 | Theis | B60W 50/082 |
| 2019/0016344 | A1 * | 1/2019 | Ehmann | B60W 50/0098 |
| 2019/0197330 | A1 * | 6/2019 | Mahmoud | A61B 5/7257 |
| 2019/0310097 | A1 * | 10/2019 | Makita | G08G 1/096844 |
| 2019/0391581 | A1 * | 12/2019 | Vardaro | A61B 5/02055 |
| 2020/0039468 | A1 * | 2/2020 | Narumi | G08B 21/06 |
| 2020/0208867 | A1 * | 7/2020 | Emoto | G06N 3/0499 |
| 2020/0218271 | A1 * | 7/2020 | Krystek | G06F 16/285 |
| 2020/0224914 | A1 * | 7/2020 | Emoto | H05B 47/115 |
| 2020/0242421 | A1 * | 7/2020 | Sobhany | G06N 20/00 |
| 2020/0393430 | A1 * | 12/2020 | Onda | G01N 29/022 |
| 2021/0039471 | A1 * | 2/2021 | Nakashima | B60H 1/00742 |
| 2021/0188049 | A1 * | 6/2021 | Etienne | B60Q 9/00 |
| 2021/0188051 | A1 * | 6/2021 | Macneille | B60H 3/0007 |
| 2021/0221399 | A1 | 7/2021 | Goto | |
| 2021/0240277 | A1 * | 8/2021 | Iliffe-Moon | G06V 20/597 |
| 2021/0283988 | A1 * | 9/2021 | De Pelsemaeker | B60H 1/2215 |
| 2022/0009308 | A1 * | 1/2022 | Neveu | B60H 1/00785 |
| 2022/0024309 | A1 * | 1/2022 | Seo | B60W 50/14 |
| 2022/0089087 | A1 * | 3/2022 | Ishiko | B60K 35/10 |
| 2022/0176968 | A1 * | 6/2022 | Brooks | G06F 18/2193 |
| 2025/0042417 | A1 * | 2/2025 | Brockwell | B60Q 3/80 |

FOREIGN PATENT DOCUMENTS

| | | | |
|---|---|---|---|
| DE | 102017209438 | A1 | 12/2018 |
| DE | 102017211931 | A1 | 1/2019 |
| DE | 102019201695 | A1 | 10/2019 |
| DE | 102018209672 | A1 | 12/2019 |
| DE | 102019200597 | A1 | 4/2020 |
| DE | 102019202230 | A1 | 8/2020 |
| DE | 102019204201 | A1 | 10/2020 |
| DE | 102020110496 | A1 | 10/2021 |
| WO | WO 2016/005289 | A1 | 1/2016 |

OTHER PUBLICATIONS

International Search Report of the International Searching Authority directed to related International Patent Application No. PCT/EP2022/079383, mailed Jan. 26, 2023, with attached English-language translation; 6 pages.

* cited by examiner

METHOD FOR GUIDING A MOTOR VEHICLE IN AN AT LEAST PARTIALLY AUTOMATED MANNER, AND MOTOR VEHICLE

TECHNICAL FIELD

The present disclosure relates to a method for the at least partially automated control of a motor vehicle, wherein the parameter value of at least one parameter of the at least partially automated control depends upon an item of occupant information relating to a vehicle occupant. In addition, the present disclosure relates to a motor vehicle.

BACKGROUND

At least partially automated driving modes in which both the longitudinal control and the lateral control are carried out by an on-board assistance system are becoming increasingly important.

Partial automation, also referred to as automation level 2, is understood to mean an automation level at which the driver nevertheless has to continuously monitor the driving operation. At higher automation levels, less and less driver monitoring is necessary. Thus, with automation, or automation level 3, the driver does not have to continuously monitor the system, wherein, however, the driver must take control of the vehicle again within a pre-warning time if required. In an autonomous driving mode, or at automation level 4, the system is continuously in control of the vehicle, wherein the driver nevertheless has to take over the driving operation again if the driving tasks can no longer be managed by the system. At automation level 5, the vehicle can always reach a safe state without driver intervention, so that, for example, vehicles without a steering wheel and pedals can be used.

If the at least partially automated control of the motor vehicle does not correspond to the preferences of an occupant, this can lead-in particular, at higher automation levels—for example, to unease or impatience, so that the acceptance of corresponding assistance functions drops.

Document DE 10 2017 008 863 A1 therefore proposes that a user also be able to reject driving profile recommendations for automated driving which are received from a server or that, on the basis of a presetting of a driver profile, suitable driving profile recommendations from the server be selected, according to which the automated driving operation then takes place.

Document DE 10 2018 209 672 A1 discloses a similar procedure in which, however, additional preferences of different vehicle occupants, which are selected by the vehicle occupants, e.g., via an app, are prioritized.

However, manual selection of preferences with respect to at least partially automated driving operation requires additional effort from users. It can also happen that a user does not find corresponding setting options. At the same time, under certain circumstances, selection from only a few specified driving styles does not allow the driving operation to be optimally tuned to the preferences of a user.

BRIEF DESCRIPTION OF THE DRAWINGS/FIGURES

Figure 1:
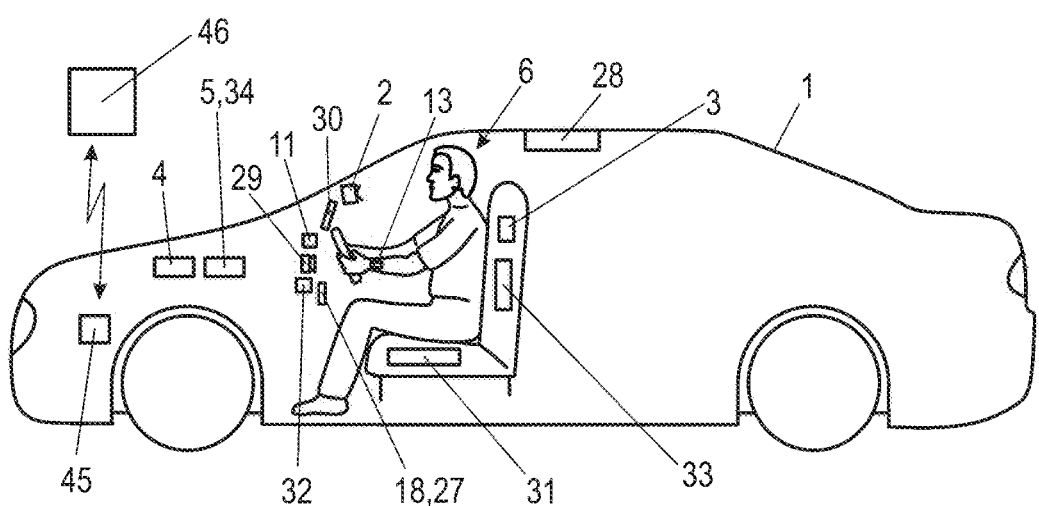
FIG. 1 illustrates a block diagram of a motor vehicle with an exemplary embodiment.

The present disclosure provides an improved possibility for parameterizing at least partially automated control of a motor vehicle, which possibility can, in particular, better tune the control to the preferences of a user.

According to one embodiment, a method of the type mentioned at the outset, wherein the item of occupant information is determined on the basis of sensor data of at least one interior sensor which at least partially images the vehicle occupant of the motor vehicle and/or of at least one temperature sensor which senses a body temperature of the vehicle occupant and/or a temperature of the interior.

It has been recognized that the mentioned sensor data provides relevant information regarding the emotions, or mood and state of mind, of the vehicle occupant. For example, rather excited moods of the vehicle occupant lead to an increased body temperature, which can be detected either directly or indirectly with a certain delay by sensing the temperature of the interior. In both cases, it can be advantageous to use spatially resolved temperature sensing—for example, by using a plurality of temperature sensors or by sensing temperature by means of an imaging infrared sensor.

The evaluation of image data of the interior sensor, which at least partially images the vehicle occupant and thus is an imaging sensor, makes it possible, for example, to recognize pupil dilation or looking away from the driving action in certain driving situations, blinks, and the like, whereby conclusions about the state of the driver and in particular about the emotional state of the driver can be drawn. Additionally or alternatively, a facial expression of the vehicle occupant, for example, can be recognized and evaluated in order to draw conclusions about the emotional state of the vehicle occupant. The interior sensor can in particular be a camera.

If there are several vehicle occupants in the motor vehicle, a reference person can be selected from among the vehicle occupants, upon which reference person the parameterization of the partially automated control will be based. This can be done manually by the vehicle occupants or automatically—for example, on the basis of the seat position or according to which vehicle occupant is carrying a vehicle key.

Alternatively, it would also be possible to determine the item of occupant information for each of several vehicle occupants and to determine the at least one parameter of the at least partially automated control on the basis of the plurality of items of occupant information. In particular, a prioritization can take place, so that primarily negative emotions such as unease, anxiety, and stress are avoided for all vehicle occupants and, only when this is achieved, will an attempt to trigger positive emotions such as well-being, relaxation, joy, and fun additionally be made.

The control of the motor vehicle on the basis of the at least one parameter can in particular be carried out in such a way that the vehicle occupant does not have to monitor the driving operation or at least does not have to monitor it continuously. Thus, in particular autonomous or automated driving or driving with automation level 3, 4, or 5 can be parameterized.

In addition to the item of occupant information, the at least one parameter of the at least partially automated control can also depend upon other influences, e.g., information regarding weather or a weather situation, which information is, for example, captured by on-board sensors and/or provided by an external device. In this case, it is in particular possible for a corresponding notification to be output to the vehicle occupant if the parameterization of the control is changed due to the weather or due to another influence that is taken into account, so that the vehicle occupant is not surprised by this.

As already mentioned, the vehicle control can be parameterized in particular on the basis of an emotional state of the vehicle occupant. This can be achieved in particular by specifying a plurality of possible emotional states of the vehicle occupant, wherein the item of occupant information describes an emotional state which is selected from among said emotional states on the basis of the sensor data. This selection can in particular be made by a classification algorithm.

In the simplest case, relatively few classes or possible emotional states can be used, so that, for example, it is possible to distinguish only between a positive, a neutral, and a negative emotional state. However, it is also possible to take into account considerably more emotional states or classes—for example, the emotional states of alarm, unease, well-being, stress, relaxation, anxiety, excitement, joy, and/or fun, etc.

The emotional state can be selected or classified in particular by an algorithm trained by machine learning 13 for example, by a neural network.

In this case, it is possible to capture the sensor data used for selecting or classifying the emotional state and data optionally additionally taken into account, e.g., regarding the current driving situation, for a plurality of test subjects and driving situations and—for example, by self-assessment of the test subjects and/or by assessment of the emotional state of the test subjects by third parties—to provide training data sets which comprise the corresponding input data for the classification, i.e., at least the sensor data, and the emotional states specified by the test subjects themselves or by third parties. On the basis of these data, supervised learning for the algorithm can then take place. Approaches for supervised learning processes are well known per se and shall therefore not be explained in detail. For example, error back-propagation can be used to train a neural network.

To reduce complexity, it can be advantageous to not supply the complete sensor data to the algorithm for determining the selected emotional state, but, rather, to at least partially pre-process the sensor data. In particular, the image data at least partially imaging the vehicle occupant in the motor vehicle can be pre-processed in order to determine characteristic variables, such as a viewing direction, a blinking frequency, a pupil size, or the like. These characteristic variables can then be used as input data for the algorithm for determining the emotional state. As a result of such a reduction in complexity, the algorithm can also be specified manually without machine learning, or the number of required training data sets for training can be considerably reduced.

The item of occupant information can additionally depend upon the sound of a voice input captured by means of a microphone in the interior of the motor vehicle and/or upon a sensed pulse and/or upon a determined degree of attentiveness and/or degree of fatigue of the vehicle occupant and/or upon a driving route selected by the vehicle occupant. It has been recognized that these parameters correlate particularly strongly with preferences of vehicle occupants with respect to the parameterization of the vehicle control or with emotional states of the vehicle occupants.

Any information that does not relate to the content or text of the voice input, i.e., in particular the spectral composition or the intonation and/or the timbre of the voice input, but also speech tempo, speech rhythm, etc., can be understood as sound of the voice input. For example, stress can lead to faster speech and to a higher harmonic content of the speech.

Approaches for determining a degree of attentiveness or degree of fatigue are well known in the prior art and are already used, for example, to inform the driver of required breaks or, in the case of lower automation levels in which the driving operation must be monitored, to request that the driver take over the driving operation again. Therefore, they shall not be explained in detail.

From the choice of a driving route, it is also possible, to a certain degree, to de-duce which type of driving operation the driver desires. For example, if the driver selects a winding mountain road, a rather sporty driving operation is often desired. If, on the other hand, a scenically beautiful route is selected, comfort-oriented driving operation may be desired, for example.

As already mentioned, the item of occupant information can be determined on the basis of at least one variable determined from the sensor data at least partially imaging the vehicle occupant, viz., a viewing direction and/or a pupil size and/or a degree of opening of an eyelid of the vehicle occupant, and/or on the basis of the time curve of the least one determined variable.

As already explained above, such pre-processing can significantly reduce the complexity of the determination of the item of occupant information—in particular, the selection of an emotional state-whereby, for example, simpler and more robust training of an algorithm for this purpose is made possible.

The determination of the mentioned variables is already used in a different context, e.g., for determining degrees of attentiveness, and therefore can be implemented with little effort.

The at least partially automated control can be adjusted in such a way that, on a specified driving route, the maximum occurring lateral accelerations and/or time curves of the lateral acceleration and/or portions of the driving route in which a longitudinal acceleration exceeding a limit value occurs and/or maximum occurring longitudinal accelerations and/or time curves of the longitudinal acceleration and/or trajectories used when driving through at least one curve of the driving route and/or minimum distances maintained from other road users and/or time curves of the vehicle speed that result for at least two values of the item of occupant information are different from one another. The mentioned variables have proven to be particularly relevant to the well-being or emotional states of vehicle occupants. The limit value for the longitudinal acceleration can be selected such that the accelerations below the limit value are hardly noticeable—for example, below 0.5 $m/s^2$.

In the method according to one embodiment, a plurality of driving modes can be specified, said driving modes specifying different parameter values for the parameter of the at least partially automated control or for at least one of the parameters of the at least partially automated control, wherein one of the driving modes is selected on the basis of the item of occupant information. After selection of a specific driving mode, this driving mode can be used unchanged until a new driving mode selection, which can be triggered, for example, by a user input—in particular, by a voice input—of the vehicle occupant or, for example, when a negative emotional state is recognized. In this case, the parameter values of all parameters can be constant or can be changed only independently of the item of occupant information—for example, according to weather or a traffic situation.

However, it is also possible that, during the partially automated control of the motor vehicle according to the selected driving mode, the item of occupant information is determined again, wherein, subsequently, in order to modify the selected driving mode, the parameter of the at least partially automated control or at least one of the parameters of the at least partially automated control is set on the basis of the item of occupant information to a parameter value which differs from the parameter value specified by the driving mode. Such an adjustment can, for example, be repeated at specified time intervals or be performed upon each fulfillment of a trigger condition. The trigger condition can be fulfilled, for example, when the item of occupant information describes the existence of a negative emotional state of the vehicle occupant—for example, alarm, unease, or a state of anxiety.

In addition to or as an alternative to the automatic adjustment of the parameter or of at least one parameter of the at least partially automated control, such an adjustment can also be made in response to a user input, i.e., can be triggered, for example, by a voice input of the vehicle occupant.

At least one of the driving modes can be specified by repeating the determination of the parameter value of the at least one parameter for the at least partially automated driving operation several times in the motor vehicle and/or in at least one other motor vehicle, whereupon, for each repetition, a reference data set describing the at least one determined parameter value is provided, wherein the reference data sets are collected and similar reference data sets are grouped, whereupon, for each of the groups of the reference data sets which reach a specified size, a common parameter value is specified for the at least one parameter of the at least partially automated control, in order to define one of the driving modes. The reference data sets can be determined in particular in the context of the previously explained adjustment of a selected driving mode by changes to the parameter or to at least one of the parameters of the at least partially automated control. By means of the described procedure, it is possible, for example, to recognize newly relevant driving modes or to further improve existing driving modes by continuous training or feedback on the basis of the determined items of occupant information.

The reference data set can indicate the parameter or the parameters themselves, and/or a selected driving mode. Optionally, additional predictive route data and/or the item of occupant information and/or the emotional state of the vehicle occupant can be stored in the reference data sets. In addition, environmental influences potentially affecting the driving operation, e.g., weather, the season, an inside temperature and/or outside temperature, an appointment calendar of the vehicle occupant, the existence of vacations or holidays, construction sites and/or accidents present in the region of the driving operation, and/or information which has been determined by means of operating inputs of the vehicle occupant—in particular, by means of a dialog system—can be stored in the reference data set, so that similar operating situations or similarities between vehicle occupants can be better recognized and taken into account.

The grouping of the reference data sets can also be referred to as layering. Similarity can be determined by determining distances for all or parts of the data in the reference data set and then calculating a distance measure for the total reference data sets—for example, as the sum of the deviations or of the deviation squares. The limit for the size of the group at or above which a corresponding driving mode is defined can be specified absolutely. However, a proportional limit value which depends upon the number of reference data sets evaluated in total is preferably used.

On the basis of the item of occupant information or in particular a selected driving mode, parameters for other vehicle devices can also be specified in addition to the at least one parameter of the at least partially automated control—in particular, in order to, holistically, positively influence the emotional state of the vehicle occupant or to provide a holistic driving mode.

In particular, additionally, a parameter of a route determination and/or of a lighting device and/or a sound device and/or an entertainment device and/or a temperature control device and/or a ventilation device and/or a massage device and/or a voice control system of the motor vehicle can be specified on the basis of the item of occupant information. If, for example, stress or unease of the vehicle occupant is recognized, relaxation of the vehicle occupant can be worked towards by suitable selection of the vehicle control and by suitable parameterization of the mentioned devices or of at least parts of these devices.

As the lighting device, in particular interior or ambient lighting can be parameterized—for example, in order to illuminate the interior rather with warm colors for comfort-oriented driving and rather with blue shades for dynamic driving. As the temperature control device, an air conditioning system or a seat heating system or seat zone heating system can, for example, be parameterized.

As already explained above, desires regarding the driving operation can be deduced on the basis of a route selected by a vehicle occupant. Conversely, however, a suitable route which, for example, has an exciting or calming effect on the driver can also be selected on the basis of the item of occupant information or in particular the emotional state.

In another embodiment, the invention relates to a motor vehicle having at least one interior sensor and/or at least one temperature sensor and a control device which is configured for the at least partially automated control of the motor vehicle, wherein the control device or a processing device of the motor vehicle is configured to carry out the method according to the invention. Features explained with respect to the method according to an embodiment—in particular, features concerning devices present in the motor vehicle—can be applied, with the mentioned advantages, to the motor vehicle according to the embodiment, and vice versa.

FIG. 1 shows a motor vehicle 1 having an imaging interior sensor 2—in particular, a camera, a temperature sensor 3, which is used to sense the body temperature of the vehicle occupant 6 directly or by sensing the temperature of the interior of the motor vehicle 1, and a control device 4, which is configured for the at least partially automated control of the motor vehicle—in particular, for the fully automated control of the motor vehicle 1. A processing device 5 or, alternatively, the control device 4 itself implements a method which is used to parameterize, on the basis of sensor data 7, 8 of the interior sensor 2 and of the temperature sensor 3, the at least partially automated driving operation implemented by the control device 4. This method is explained in more detail below with additional reference to FIG. 2.

In step S1, sensor data 7, i.e., in particular image data, of the interior sensor 2 are captured. In step S2, the sensor data 8 of the temperature sensor 3 are captured. In principle, on the basis of these sensor data 7, 8, an item of occupant information 10 relating to the vehicle occupant 6 could be directly determined. However, as a result of the additional steps S3 and S4, which are explained below, this can be carried out more robustly and by a simpler algorithm.

In step S3, additional information is captured which, in particular, can contribute to robust classification of the emotional state 9 of the vehicle occupant 6. For this purpose, in the example, the sound of a voice input 12 captured by means of a microphone 11 in the interior of the motor vehicle 1 is evaluated—for example, the intonation, the timbre, the speech tempo, and/or the speech rhythm. In the example, a pulse 14 of the vehicle occupant 6 is also determined by means of a smart watch 13.

In addition, a determined degree of attentiveness 15 or degree of fatigue 16 can be used which, for example, can in any case be used for other purposes—for example, in order to ensure sufficient attentiveness for low automation levels. Approaches for determining these variables are known per se and shall therefore not be explained.

If the vehicle occupant 6 has actively selected a driving route 17, e.g., on the navigation device 18, properties of this driving route 17 can also be taken into account—for example, whether it is a rather winding route or a route with a rather smooth course, or a scenic route.

On the basis of the data collected in steps S1 to S3, the item of occupant information 10 is to be determined in step S5, wherein this is in particular a selection of one of a plurality of possible emotional states 9 of the vehicle occupant 6. Such a classification of an emotional state on the basis of the data determined in steps S1 to S3 can be carried out, for example, by means of an algorithm trained by machine learning, as has already been explained in the general part.

If, however, sensor data 7 of the imaging sensor 2 are to be processed directly, a relatively complex algorithm, e.g., a neural network with an input layer having very many neurons, is required. In order to enable robust training even with relatively few training data sets or to parameterize such an algorithm manually, it is therefore expedient to reduce its complexity.

Pre-processing of the image data or of the sensor data 7 can therefore first take place in step S4, before step S5, in order to reduce the relatively large amount of the sensor data 7 to a relatively small number of determined variables. In the example, the viewing direction 19, a pupil size 20, and a degree of opening 21 of the eyelids of the vehicle occupant are determined. If the sensor data 7 are image sequences or video data, in particular a time curve of these variables can be determined.

After this pre-processing, a classification of the emotional state 9 of the vehicle occupant and thus the determination of the item of occupant information 10 takes place in step S5, as already explained.

In step S6, a plurality of parameters 23 of the at least partially automated control are specified on the basis of the item of occupant information 10. The parameters 23 can in particular be parameters whose variation results, when the same specified driving route is traveled, in different maximum lateral accelerations, a different time curve of the lateral acceleration, longitudinal accelerations at different portions of the driving route, different maximum longitudinal accelerations or time curves of the longitudinal accelerations, different trajectories when driving through at least one curve, different minimum distances from other road users, and/or a different time curve of the vehicle speed.

Since varying the parameters 23 independently of one another can have the result that a driving operation which is pleasant to the vehicle occupant 6 or causes positive emotions is produced only after a relatively large number of changes to the parameter 23, it can be advantageous to specify instead a selection of a plurality of driving modes 24, 40, 41, the provision of which will be explained in more detail later with reference to FIG. 3. Each driving mode 24, 40, 41 specifies a parameter value 22, 43, 44 for each of the parameters 23. The parameter values 22 for the parameters 23 are thus specified by the selection (shown by way of example in FIG. 2) of the driving mode 24.

By selecting a suitable driving mode 24, positive emotions of the vehicle occupant 6 are to be brought about in a targeted manner, and so, for example, a rather exciting or rather relaxing driving operation shall be performed as required. The positive influence on the emotions of the vehicle occupant can be additionally amplified if other vehicle devices which do not directly affect the driving operation are also configured accordingly, and, for this rea-son, parameters 26 for controlling other vehicle components are specified in step S7.

In the example, the route determination 27 by the navigation device 18 is influenced, lighting by a light device 28—in particular, ambient lighting—is adjusted, a sound device 29, e.g., for outputting calming nature sounds, is controlled, an entertainment device 30, e.g., a radio or a video device, is controlled in order to make a suitable program selection, an appropriate temperature is set by means of a temperature control device 31—in the example a seat heating system—a scenting device 32 is controlled, and, under certain circumstances, a massage device 33 is used.

In addition, a voice control system 34 of the motor vehicle 1, implemented, in the example, by the processing device 5, can be configured—for example, to adjust the frequency with which the vehicle occupant is addressed, the choice of words, and/or the manner of dialog of such a digital assistant on the basis of the emotional state 9 or item of occupant information 10.

In step S8, the at least partially automated—in particular, fully automated-driving operation is then carried out according to the parameters 23.

Figure 2:
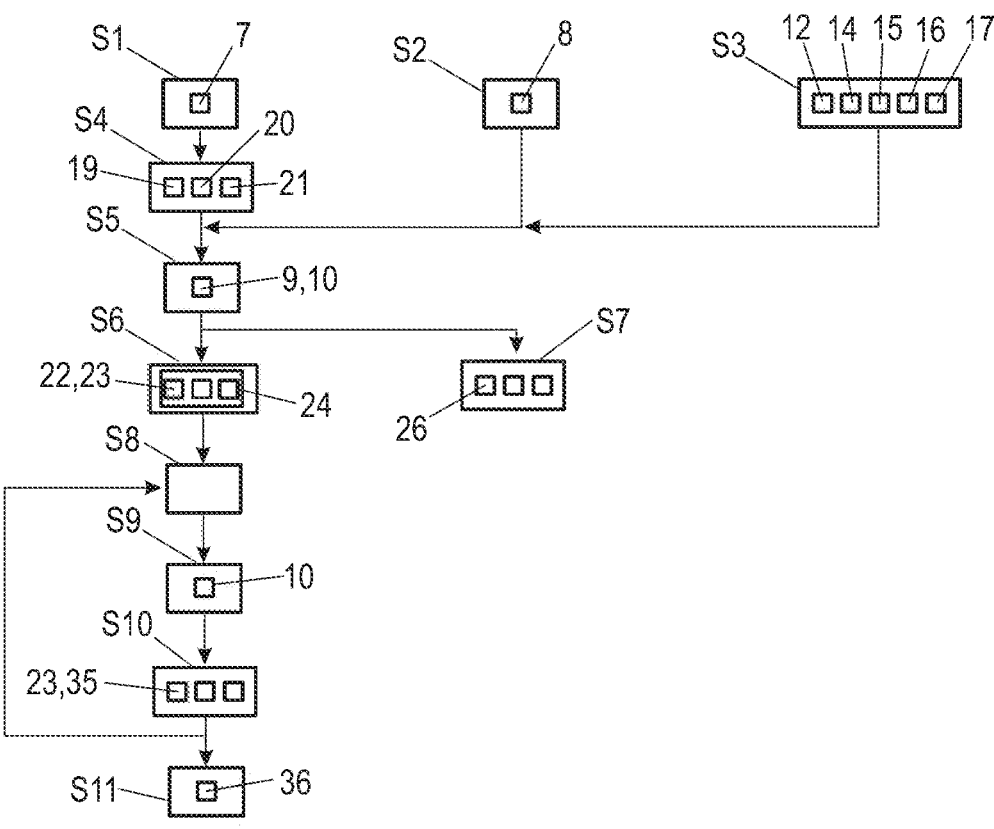
FIG. 2 illustrates a method of an exemplary embodiment of the disclosure.

During the automated control, the item occupant information 10 is determined repeatedly in step S9—for example, at a fixed time interval or when a trigger condition is fulfilled. For reasons of clarity, this is shown in FIG. 2 only as a single step, wherein step S9 can comprise, for example, a repetition of steps S1 to S5.

In principle, a selection of one of the specified driving modes 24, 40, 41 could be made again on the basis of this item of occupant information 10. However, it can be advantageous if, instead, new parameter values 35 are determined only for some of the parameters 23 on the basis of the item of occupant information 10, as shown schematically in step S10. This can be expedient, for example, if the specified driving modes 24, 40, 41 describe only relatively few, clearly different driving modes. By means of a subsequent fine tuning of individual parameters 23 in the framework of repeated determination of the item of occupant information 10, the previously selected driving mode 22 can be slightly varied in order to adapt said driving mode to the preferences of the individual vehicle occupant 6 in detail.

Steps S8 to S10 are in particular repeatedly carried out, wherein, in a case (not shown) in which, for example, a clearly negative emotional state 9 of the vehicle occupant 6 is determined, it is also possible to return to step S6 in order to select a fundamentally different driving mode 24, 40, 41.

In step S11, a reference data set 36, which in particular is anonymized, can be provided, comprising the parameter values 35 determined in step S10 for the parameters 23 and, under certain circumstances, parameters of additional vehicle devices, as were explained with reference to step S7.

This reference data set can, for example, be transmitted by means of the communication device 45 of the motor vehicle to a vehicle-external device 46, e.g., a back-end server of the vehicle manufacturer, and can be used there, as will be explained below with reference to FIG. 3, to adapt the range of available driving modes or to define these driving modes 24, 40, 41.

Figure 3:
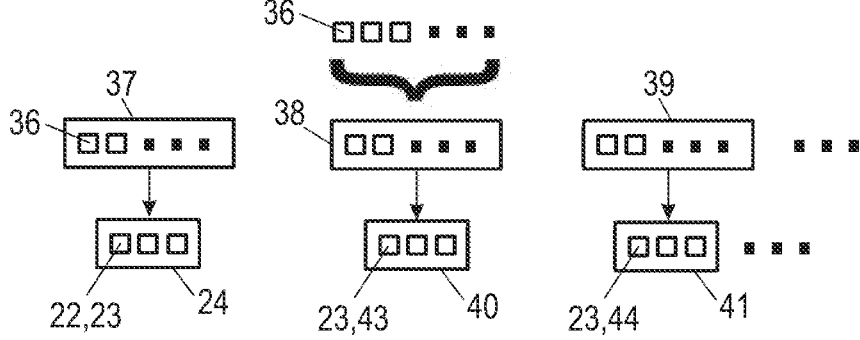
FIG. 3 illustrates a schematic of an exemplary embodiment of the disclosure.

As shown schematically in FIG. 3, for this purpose the reference data sets 36 provided by different motor vehicles 1 in different driving situations can first be combined to form groups 37, 38, 39, each of which comprises similar reference data sets 36. If a group 37, 38, 39 reaches a specified size, which can be dependent in particular upon the total number of reference data sets 36 processed, then, for each of the various parameters 23, a common parameter value 22, 43, 44 valid for the entire group is determined on the basis of the reference data sets 36. In the simplest case, this can be an average value or a median of the parameter values for the parameter 23 in question in the reference data sets 36 of the group 37, 38, 39 in question. However, more complex determination methods which, for example, can take into account an interaction between different parameters 23 are also possible.

The driving modes 24, 40, 41 thus determined can subsequently be distributed to the motor vehicles which are to carry out the method explained above. The entire fleet is thus ultimately used to learn optimal driving modes that are relevant for a large number of vehicle occupants and driving situations.

The invention claimed is:

1. A method for at least partial autonomous control of a motor vehicle, the method comprising:
 determining an item of occupant information associated with a vehicle occupant,
  wherein the item of occupant information is determined based on sensor data from an interior sensor which at least partially images the vehicle occupant,
  wherein at least one temperature sensor senses a body temperature of the vehicle occupant and a temperature of an interior of the motor vehicle, and
  wherein the at least one temperature sensor extracts the item of occupant information by sensing the temperature of the interior of the motor vehicle after a temporal delay associated with a change of the body temperature of the vehicle occupant; and
 controlling, using the at least partially autonomous control, the motor vehicle based on a parameter value of at least one parameter, the parameter value depending on the item of occupant information.

2. The method according to claim 1, wherein the item of occupant information describes an emotional state that is selected based on the sensor data, the emotional state being one of a plurality of possible emotional states of the vehicle occupant.

3. The method according to claim 1, wherein the item of occupant information further depends upon a sound of a voice input captured by a microphone in the interior of the motor vehicle and/or upon a sensed pulse and/or upon a determined degree of attentiveness and/or a degree of fatigue of the vehicle occupant and/or upon a driving route selected by the vehicle occupant.

4. The method according to claim 1, wherein the determining the item of occupant information is further based on at least one variable determined from the sensor data, wherein the at least one variable comprises:
 a viewing direction,
 a pupil size,
 a degree of opening of an eyelid of the vehicle occupant, and/or
 a time curve of the least one determined variable.

5. The method according to claim 1, wherein the at least partial autonomous control is adjusted such that, on a specified driving route, maximum occurring lateral accelerations and/or time curves of the lateral acceleration and/or portions of the specified driving route in which a longitudinal acceleration exceeding a limit value occurs and/or maximum occurring longitudinal accelerations and/or time curves of the longitudinal acceleration and/or trajectories used when driving through at least one curve of the specified driving route and/or minimum distances maintained from other road users and/or time curves of the vehicle speed that result for at least two values of the item of occupant information are different from one another.

6. The method according to claim 1, wherein a plurality of driving modes are specified, said plurality of driving modes specifying different parameter values for the at least one parameter of the at least partially automated control or for at least one of the parameters of the at least partially automated control, wherein one of the plurality of driving modes is selected based on the item of occupant information.

7. The method according to claim 6, wherein during the partially automated control of the motor vehicle according to the selected driving mode, the item of occupant information is determined again, wherein, subsequently, in order to modify the selected driving mode, the at least one parameter of the at least partially automated control or at least one of the parameters of the at least partially automated control is set based on the item of occupant information to a parameter value which differs from the parameter value specified by the driving mode.

8. The method according to claim 6, wherein at least one of the plurality of driving modes is specified by repeating the determination of the parameter value of the at least one parameter for the at least partially automated driving operation several times in the motor vehicle and/or in at least one other motor vehicle, whereupon, for each repetition, a reference data set describing at least one determined parameter value is provided, wherein reference data sets are collected and similar reference data sets are grouped, whereupon, for each of the groups of the reference data sets which reach a specified size, a common parameter value is specified for the at least one parameter of the at least partially automated control, in order to define one of the driving modes.

9. The method according to claim 1, wherein an additional parameter of a route determination and/or of a lighting device and/or of a sound device and/or of an entertainment device and/or of a temperature control device and/or of a scenting device and/or of a massage device and/or of a voice control system of the motor vehicle is specified based on the item of occupant information.

10. A motor vehicle comprising:
 at least one interior sensor and/or at least one temperature sensor; and
 a control device,
  wherein the control device at least partially automates control of the motor vehicle based on a parameter value of at least one parameter, and
  wherein the control device is configured to:
 determine an item of occupant information associated with a vehicle occupant,
  wherein the parameter value depends on the item of occupant information, wherein the item of occupant information is determined based on sensor data from an interior sensor which at least partially images the vehicle occupant, wherein at least one temperature sensor senses a body temperature of the vehicle occupant, and/or a temperature of an interior of the motor vehicle, and wherein the at least one temperature sensor extracts the item of occupant information by sensing the temperature of the interior of the motor vehicle after a temporal delay associated with a change of the body temperature of the vehicle occupant.

* * * * *